R. ENGEL.
MACHINE FOR THE DIVIDING AND SHAPING OF DOUGH.
APPLICATION FILED FEB. 19, 1913.

1,122,888.

Patented Dec. 29, 1914.

WITNESSES

INVENTOR
Richard Engel
BY
ATTORNEYS

UNITED STATES PATENT OFFICE.

RICHARD ENGEL, OF VIENNA, AUSTRIA-HUNGARY.

MACHINE FOR THE DIVIDING AND SHAPING OF DOUGH.

1,122,888.  Specification of Letters Patent. Patented Dec. 29, 1914.

Application filed February 19, 1913. Serial No. 749,347.

*To all whom it may concern:*

Be it known that I, RICHARD ENGEL, engineer, a subject of the Emperor of Austria-Hungary, resident of Vienna, IV, in the Empire of Austria-Hungary, (whose postoffice address is No. 6 Schelleingasse,) have invented a certain new and useful Improvement in Machines for the Dividing and Shaping of Dough, of which the following is a specification, reference being had to the accompanying drawing, forming a part thereof, in which similar letters of reference indicate corresponding parts.

This invention relates to a machine for dividing and shaping dough, more particularly for the manufacture of pastry.

It has been already suggested to effect the kneading of pieces of dough by means of bands driven with different speed in opposite direction at a decreasing distance apart. It is also known to form into balls pieces of dough separated by hand or by means of separate dividing machines, by means of a series of channel-like molds arranged side by side.

The invention relates to a combination of the two devices in such a manner that the machine according to this invention divides in one operation undivided pieces of dough into balls of dough of equal weight and gives the divided pieces the final shape, so that the shaping which otherwise is required after the division into parts of equal weight, is effected by the machine simultaneously with the division.

Figure 1:
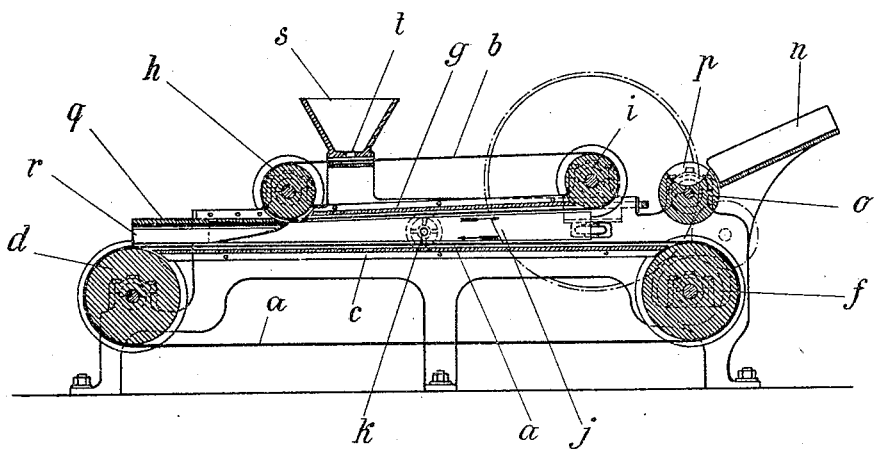
Figure 2:
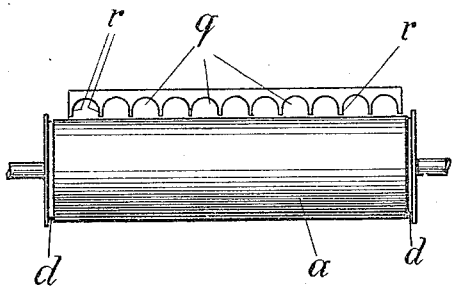
Figure 3:
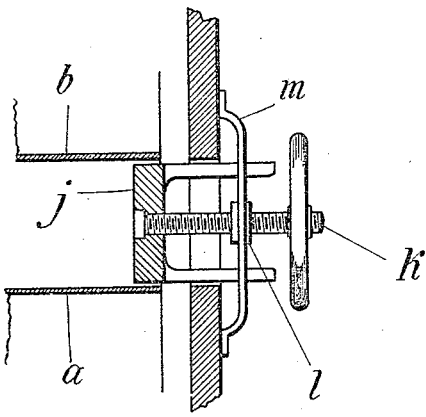

The accompanying drawing shows the machine for carrying out the process, Figure 1 being a longitudinal section, Fig. 2 showing the divided mold in front elevation and Fig. 3 being a view of a detail.

The machine consists of two endless bands $a$ $b$ driven in opposite directions. The bottom band $a$ travels along a table $c$ and around drums $d$ $f$. The upper band $b$ travels along a table $g$, around the drums $h$ $i$. The bottom band travels faster than the upper band which is not arranged parallel with, but at an angle to the bottom band, so that the distance between the bands always decreases in the direction of movement of the bottom band $a$. The bearings of the drums $h$ $i$ of the upper band $b$ are adjustable in the vertical direction and also in the direction parallel to the band, in order to enable the inclination of the band, to be changed, and the band to be stretched. According as the upper band $b$ is inclined to a greater extent relatively to the bottom band, the more thoroughly the piece of dough is kneaded during its movement between the bands.

Between the two bands $a$ and $b$ are arranged at the edges parallel ledges $j$ (Figs. 1 and 3) limiting the width of the band, and consequently the length of the dough cylinder. The ledges are adjustable toward and from each other in order to enable the width of the working surface of the bands, and the length of the dough cylinders, to be regulated. To that end, each ledge is supported for instance by a screw spindle $k$, the nut $l$ of which is arranged in arms $m$ secured to the frame of the machine. The screw spindle $k$ is provided with a hand wheel, and when the latter is operated the ledge will be moved as desired.

The supply of pieces of dough of equal weight to the machine, is effected by means of an inclined channel $n$ in front of which is rotatably supported a roll $o$, provided with a trough-like recess $p$. Whenever the recess $p$ of the roll $o$ comes in front of the end of the groove $n$, it takes up a piece of dough and during further rotation throws it on the band $a$. The piece of dough is carried forward by the band $a$ and in its movement between the two bands $a$ $b$ driven in opposite directions, is kneaded and formed into a cylinder of the width of the portions of band situated between the ledges $j$.

The farther the dough cylinder is advanced between the endless bands owing to the greater speed of the band $a$, the more energetically will the bands knead the dough, the distance between the bands always decreasing in the direction of movement of the bottom band.

At the turning point of the upper band $b$, a dividing mold is arranged on the bottom band $a$. The said mold is formed with semi-cylindrical grooves $q$ facing the band $a$, between which are arranged thin knife-like partitions $r$. When the cylinder or piece of dough is carried by the band $a$ through the dividing mold, the said piece is sub-divided into a number of pieces of dough corresponding to the number of grooves $q$ of the mold, the said pieces of dough in passing through the grooves, assuming spherical shape. The spherical pieces of dough coming out from the dividing mold are sufficiently kneaded and have a shape suitable for being converted directly into pastry.

Above the upper band b is arranged a hopper s, in the bottom of which is provided an opening t. Under the bottom travels in a suitable guide the upper portion of the endless band b. The hopper is filled with flour, and the opening t always allows a suitable quantity of flour to escape on the band b, so that the latter is thus continually covered with flour.

The drums i f of the endless bands, and the roller o, are driven continuously by a suitable driving means.

The machine works continuously and very uniformly and produces with the same dividing mold, a product of the same size, weight and shape. The dividing form is interchangeable, so that according to the dividing form used or to the shape and number of grooves, pieces of dough of different size and of different shape can be obtained with one and the same machine.

Having now particularly described and ascertained the nature of my said invention and in what manner the same is to be performed, I declare that what I claim is:—

1. A machine for dividing and shaping dough, comprising endless bands between which the pieces of dough are formed, the said bands traveling at different speeds in opposite directions and arranged at a decreasing distance apart, means for regulating the width of the working surfaces of the bands and consequently the length of the pieces of dough acted upon, and a series of equal molds arranged side by side and located adjacent the converging ends of the bands, the band moving with the higher speed traveling in the direction of the converging ends of the bands, and drawing the said pieces of dough through the said molds, whereby the pieces of dough are divided into equal parts by the molds and rolled in the molds into balls of the same size and weight.

2. A machine of the class described comprising a pair of superposed bands moving at a different speed in opposite directions and approaching toward each other; means for adjusting the convergency of said bands; means for delivering a predetermined quantity of dough on the lower of said bands, the said lower band moving faster than the upper band and drawing the dough to the opposite side and toward which side said bands converge, consequently submitting the dough to the action of both bands throughout their length to thoroughly knead the same; and a series of equal molds at the said side toward which the dough travels, arranged transversely to said bands, and from which the dough is delivered, the said molds dividing the dough in equal parts and shaping the same.

3. A machine of the class described, comprising a pair of endless bands arranged one above the other and moving at different speeds in opposite directions and approaching each other in the direction of the delivery end of the machine, a device for delivering pieces of dough of the same size to the lower band at the receiving end of the machine, the said lower band traveling in the direction of the delivery end of the machine and at greater speed than the upper band, the pieces of dough being acted upon by both bands throughout the length of their working surfaces thereby thoroughly kneading the pieces of dough, and forming the same into cylinders, and a dividing mold at the delivery end of the machine through which the cylinders of dough are drawn by the said lower band, the said mold being arranged transversely of the lower band at the turning point of the upper band and serving to divide the cylinders of dough into equal parts and to shape the divided parts.

4. A machine of the class described, comprising a pair of endless bands arranged one above the other and driven in opposite directions, the lower band traveling in the directions of the delivery end of the machine, the upper band being arranged at an angle to the lower band and converging toward the latter in the direction of travel of the lower band, the said lower band moving faster than the upper band and extending at its ends beyond the ends of the upper band, adjustable rotating means located above the receiving end of the lower band and arranged to receive a predetermined quantity of dough and deliver the same to said lower band at the receiving ends of the bands, the dough being subjected to the action of both bands throughout their length to thoroughly knead the same and form the dough into a cylinder, a dividing mold arranged transversely on the lower band at the turning point of the upper band and at the delivery end of the machine and through which the dough is carried by the said lower band, the said mold dividing the cylinder of dough into equal pieces and shaping the divided pieces.

In testimony whereof I have signed my name to the foregoing specification in the presence of two subscribing witnesses.

RICHARD ENGEL.

Witnesses:
AUGUST FUGGER,
GUSTAV WOLFFE.

Copies of this patent may be obtained for five cents each, by addressing the "Commissioner of Patents, Washington, D. C."